United States Patent [19]

DeWald et al.

[11] 4,203,879

[45] May 20, 1980

[54] PLASTISOL RESINS HAVING IMPROVED CLARITY

[75] Inventors: Raymond C. DeWald, Douglassville; Ronald M. Ellis; Stephen T. Fitzpatrick, both of Pottstown, all of Pa.

[73] Assignee: The Firestone Tire & Rubber Company, Akron, Ohio

[21] Appl. No.: 939,035

[22] Filed: Sep. 1, 1978

[51] Int. Cl.$^2$ .................. C08L 91/00; C08L 27/06
[52] U.S. Cl. ................... 260/23 XA; 260/29.6 E
[58] Field of Search ............... 260/31.2 R, 31.8 R, 260/29.6 E, 29.6 N, 23 XA; 526/344.2

[56] References Cited

U.S. PATENT DOCUMENTS

| | | | |
|---|---|---|---|
| 2,771,457 | 11/1956 | Barnes et al. | 526/344.2 |
| 2,840,549 | 6/1958 | McNulty | 526/344.2 |
| 3,640,935 | 2/1972 | Abriss | 260/29.6 E |
| 3,755,225 | 8/1973 | Pierce et al. | 260/23 XA |
| 3,882,195 | 5/1975 | Daniels et al. | 526/344.2 |
| 3,950,318 | 4/1976 | Park et al. | 526/344.2 |

*Primary Examiner*—Joseph L. Schofer
*Assistant Examiner*—Peter F. Kulkosky

[57] ABSTRACT

A method for improving the clarity of plastisol resin films includes the steps of polymerizing vinyl chloride alone or in the presence of a copolymerizable monomer to yield a latex, and dissolving a nonionic emulsifier in the latex prior to spray drying. The resulting mixture is thereafter spray dried to yield a resin which in turn can be mixed with a plasticizer to form a paste and spread as a thin layer to be fused into a film with heat. Alternatively, the nonionic emulsifier can be added, after spray drying, during preparation of the paste by mixing the emulsifier and plasticizer followed by addition of the resin. The nonionic emulsifiers of the present invention have the formula R—O—$(CH_2CH_2$—O$)_n$H wherein R is selected from the group consisting of fatty acids, polyol fatty acid esters, fatty alcohols, fatty amines, fatty amides, polypropylene oxide and alkylated phenol, and n is an integer ranging from 1 to about 50.

26 Claims, No Drawings

PLASTISOL RESINS HAVING IMPROVED CLARITY

Technical Field

The present invention relates to a method for improving the clarity of plastisol resins, by the addition of nonionic emulsifiers as surfactant modifiers thereto, and also relates to plastisol resins containing such additives. Plastisols are suspensions of polyvinylchloride (PVC) resin, or vinyl chloride copolymers, in a liquid plasticizer. Surfactants are commonly added during compounding of the plastisol resin to lower the viscosity and improve viscosity stability and the release of air, the latter being important when the plastisol is to be employed as a coating wherein bubbles trapped in the film are visible and not tolerable.

When anionic surfactants are employed for these purposes, their presence in the finished resin causes hazing or clouding in films formed therefrom, the clouding being due to the insolubility of the metal ions in the fused clear film. Where the resin is intended for coating or film applications, as in a flooring wearlayer, it must be clear and have a high gloss. Hazing and clouding in such films are undesirable, however, previous attempts to overcome these problems have involved reduction or elimination of the surfactants giving rise to other problems.

Background Art

Nonionic emulsifiers have been employed with plastisol resins heretofore as latex post polymerization stabilizers due to their neglible effect on resin properties in general such as gloss, clarity, heat stability and paste viscosity. However, improvements in the clarity of films, clouded by residues of the anionic surfactants, have not been expected by adding a nonionic emulsifier to the resin.

U.S. Pat. No. 3,755,255 disclosed a process involving the addition of water-soluble ethylene oxide-ethylene glycol adducts to the aqueous emulsion polymerization product of vinyl chloride with and without other monomers. The products containing these additives were reported to show improved physical characteristics such as excellent air release, negligible moisture sensitivity, good rheology at high shearing stress, high gloss, optimum clarity and heat stability. By the addition of non-emulsifiers to plastisol resins the patentees were able to lower the moisture content of the plastisol resin, thereby lowering initial viscosity and retarding viscosity increases concommitant with aging. Varying moisture content in plastisol resins caused by variable relative humidity can have a strong effect on paste viscosity. By the addition of the non-emulsifiers, the patentees provided a solution to the moisture content problem in order to provide good resin paste viscosities.

The patentees stated that none of the glycol adducts they found to be suitable were emulsifiers. In one example, an emulsifier, polyethylene glycol monoester, was added, and the resulting polymer products tested exhibited markedly poorer characteristics than when the non-emulsifier additives of the invention were employed.

U.S. Pat. No. 3,383,346 disclosed a method for preparing plastisol resins and of controlling the size distribution of the resin particles, the size having an important effect on film properties such as gloss and clarity. During preparation of the resin, a saturated alcohol or an ethylene oxide adduct thereof was added to the reaction medium.

U.S. Pat. No. 3,251,816 disclosed a method of preparing emulsion polymers particularly homo- and copolymers of acrylic acid and methacrylic acid esters, by adding non-ionic emulsifiers to the monomers. Plastic film products therefrom have been characterized by water-resistivity and exhibit increased translucency even after immersion in water.

U.S. Pat. No. 3,208,965 disclosed a process for the preparation of vinyl chloride polymers which included the addition of wax-like coating agent emulsifiers comprising certain fatty acid esters and polyglycol ethers of polyhydric alcohols and other esters. The addition of the emulsifier permitted the formation of resin-plasticizer pastes characterized by low viscosity and excellent stability upon storage.

Thus, it is seen that others have added various emulsifiers and non-emulsifiers to various polymers and copolymers for the improvement of various physical characteristics of products made therefrom. However, none of the patents has disclosed the addition of nonionic emulsifiers to plastisol resins in order to effect a dramatic improvement in clarity without a detrimental effect on other resin properties.

Disclosure of Invention

It is, therefore, an object of the present invention to provide a method for improving the clarity of films formed from plastisol resins comprising PVC homo- and copolymers. It is another object of the present invention to provide such a method whch does not require the elimination of or a reduction in the amount of surfactants that are generally added to plastisol resin compositions. It is yet another object of the present invention to provide a method for improving the clarity in plastisol resin films without causing detrimental effects to other resin properties.

It is another object of the present invention to provide a group of nonionic emulsifiers that can be added to plastisol resins as surfactant modifiers to improve the clarity in films formed from the resins. It is a further object of the present invention to provide plastisol resins containing nonionic emulsifiers.

These and other objects, together with the advantages thereof over the prior art, which shall become apparent from the specification that follows, are accomplished by our invention as hereinafter described and claimed.

In general, the method of the present invention for improving the clarity of plastisol resin films includes the steps of polymerizing vinyl chloride alone or in the presence of a copolymerizable monomer such as vinyl acetate to yield a latex, and dissolving a nonionic emulsifier in the latex prior to spray drying. The resulting mixture is thereafter spray dried to yield a resin which in turn can be mixed with a plasticizer to form a paste and spread as a thin layer to be fused into a film with heat. Alternatively, the nonionic emulsifier can be added, after spray drying, during preparation of the paste by mixing the emulsifier and plasticizer followed by addition of the resin.

The nonionic emulsifiers of the present invention have the formula $R-O-(CH_2CH_2-O)_nH$ wherein R is selected from the group consisting of fatty acids, polyol fatty acid esters, fatty alcohols, fatty amines, fatty amides, polypropylene oxide and alkylated phenol, and n is an integer ranging from 1 to about 50. The amount of emulsifier necessary is from about 0.1 to about 5.0 parts per 100 parts of resin. Plastisol resin films containing one or more of these emulsifiers have a high clarity compared with films of identical composition to which the emulsifier has not been added.

Preferred Mode for Carrying Out the Invention

Plastisol resins included within the present invention can be prepared via conventional dispersion processes such as emulsion, continuous emulsion or micro dispersion. In the micro dispersion process for example, monomer and an aqueous phase are polymerized in a pressure reactor. The aqueous phase consists of water and an anionic surfactant such as a sodium salt of an alkyl sulfate, alkyl aryl sulfonate, alkyl sulfonate, alkyl sulfosuccinate and the like; a fatty compound such as a fatty alcohol; and an oil soluble free radical forming initiator such as a diacyl peroxide, diperoxy dicarbonate, peroxy ester, azo compound or a sulfonyl peroxide.

One typical formulation for such a micro dispersion process is provided in Table I.

TABLE I

| Water | 200 |
|---|---|
| Vinyl chloride monomer | 100 |
| Anionic surfactant | 0.5 to 3 |
| Fatty alcohol | 0.5 to 3 |
| Oil soluble initiator | 0.01 to 0.1 |

Parts listed therein are based upon 100 parts of the monomer. The monomer and aqueous phase are mixed and homogenized before polymerization which is in turn effected in an agitated closed vessel at a temperature of from about 40° to 60° C. to yield a latex. The resulting latex is deareated in a commercially available apparatus for such purposes and is then spray dried to yield the desired resin. When the resin is subsequently mixed with a plasticizer, a fluid paste is obtained which can be molded in a conventional manner and fused with heat to form a desired product.

Suitable monomers for preparation of the plastisol resin which can be treated according to the present invention include all of the known monomers conventionally employed for plastisol production such as vinyl chloride and copolymers thereof with vinyl acetates. Other monomers copolymerizable with vinyl chloride include acrylic esters, methacrylic esters, acrylonitrile, maleic and fumaric acids and esters thereof and vinylidene chloride. Similarly, the plasticizers with which the resins of this invention can be mixed to form a paste include known esters having high boiling points such as n-butyl benzyl phthalate, dioctyl adipate, acetyl tributyl citrate and diisodecyl phthlate.

The initiator is preferably an oil soluble free radical forming compound such as a diacyl peroxide, diperoxy dicarbonate, peroxy ester, azo compound, sulfonyl peroxide and the like, and is employed in an amount of from about 0.01 to about 0.1 parts per 100 1 parts of monomer. Suitable anionic surfactants include the sodium salts of alkyl sulfates, alkyl aryl sulfonates, alkyl sulfonates, alkyl sulfosuccinates and the like.

It is to be understood that selection of monomer, plasticizer, initiator and other processing ingredients for the resin is not critical to the subject invention, the method and additives described herein being applicable to all known plastisol resin and plasticizer-paste formulations to improve clarity of the fused film products resulting therefrom.

According to the method of the present invention, the addition of one or more nonionic emulsifiers directly to the latex, prior to spray drying, or to the resin paste mixture prior to fusing, will enable the fused films which are formed to be crystal clear and transparent, despite the presence of the necessary anionic surfactant. The nonionic emulsifiers of the present invention have the formula $R-O-(CH_2CH_2O)_nH$ wherein R is derived from fatty acids, polyol fatty acids esters, fatty alcohols, fatty amines, fatty amides, a polypropylene oxide or an alkylated phenol, and n is an integer ranging from 1 to about 50. Such compounds include polyoxyethylene fatty acid esters, polyoxyethylene polyol fatty acid esters, polyoxyethylene fatty alcohol ethers, polyoxyethylene alkylol amides, polyoxyethylenepolyoxypropylene block copolymers and mixtures thereof.

Molecular weights of the nonionic emulsifiers are generally within the range of from about 200 to 4000. The amounts added, based upon 100 parts of the resin (phr), can range from about 0.1 to about 5.0, with 0.3 to 1.0 being preferred.

Fatty acid esters and polyol fatty acid esters are those derived from carboxylic acids such a lauric, stearic and oleic. Representative compounds include diethylene glycol monolaurate, diethylene glycol oleate, ethylene glycol monostearate, propylene glycol stearate and propylene glycol monostearate.

Fatty alcohols are those derived from the foregoing fatty acids which have been reduced and include lauryl, decanoyl, tetradecanoyl, cetyl, stearyl and oleyl. Representative emulsifiers include lauryl alcohol ethoxylates and cetyl alcohol ethoxylates.

Fatty amines and amides include lauryl amine and lauryl ethanolamide, and representative emulsifiers thereof are lauryl amine ethoxylate and lauryl ethanolamide ethoxylate. Suitable alkylated phenol emulsifiers are nonyl phenol ethoxylates and octyl phenol ethoxylates.

The foregoing list of compounds is not intended to be exhaustive or limiting on the scope of the invention hereinafter claimed, but merely representative of the various nonionic emulsifiers that can be employed. As will be recognized by those skilled in the art, selection of other fatty acids, alcohols and the like can be made on the basis of availability and cost.

According to a method of the present invention, one or more of the nonionic emulsifiers disclosed herein is added to the paste formed between the resin and the plasticizer. Alternatively, the nonionic emulsifier can be added to the latex prior to spray drying. The resulting resin, containing the nonionic emulsifier, can then be employed to form a paste. In the examples which follow, the paste was prepared in a beaker by adding the various liquid ingredients and emulsifier followed by the resin. The ingredients were subsequently blended with a high speed mixer until the paste was smooth and free-flowing, generally from 3 to 5 minutes being adequate. The paste was next deareated in a vacuum oven at ambient temperature and 30 inches vacuum until foaming, representative of air release, ceased. Quantities of the paste were then drawn down to a thickness of 15 mils on glass plates and fused in an oven at 205° C. for about 10 to 16 minutes.

A control formula consisting of the following ingredients is provided in Table II.

TABLE II

| | |
|---|---|
| Resin (prepared from micro dispersion process here inabove) | 100 g |
| n-Butyl benzyl phthlate[a] | 35 g |
| Nuoplaz 1046[b] | 15 g |
| Mark 1482A[c] | 2 g |
| Varsol diluent[d] | 5 –8 g |

[a] Physical properties of the n-butyl benzyl phthlate employed including a boiling point of 370° C. at 760 mm Hg, molecular weight of 312.4 and approximate viscosity of 50 cP at 25° C.
[b] Nuoplaz 1046 is a registered trademark of Tenneco Chemicals, Inc. for a non-phthalate ester utilized as a plasticizer.
[c] Mark 1482A is a stabilizer supplied by Argus Chemicals.
[d] Varsol is a registered trademark of Humble Oil & Refining Co. for straight petroleum aliphatic solvents.

Table III which follows lists examples of various nonionic emulsifiers we have employed, the amount of each being 1.0 phr. Clarity is described on a scale of 1 to 10, 1 being assigned to the control and indicating complete haze and cloudiness in the film and 10 indicating a clear film with no haze. Heat stability is also described for the film samples which, after fusion for 16 minutes, vary from slightly yellow to yellow to deep yellow.

TABLE III

| Additive | Clarity (10 Min. at 205 °C.) | Heat Stability (1 Min. at 205 °C.) |
|---|---|---|
| Control (no additive) | 1 | Slightly Yellow |
| Siponic L-12[a] | 3 | Yellow |
| Tween 20[b] | 4 | Deep Yellow |
| Amidox L-5[c] | 2 | Yellow |
| Pluronic L44[d] | 6 | Deep Yellow |
| Pegosperse 400 ML[e] | 5 | Slightly Yellow |
| Renex 30[f] | 5 | Yellow |
| Triton N 101[g] | 5 | Yellow |
| Triton X 165[h] | 5 | Yellow |
| Triton X 405[h] | 5 | Deep Yellow |
| Triton X 705[h] | 5 | Deep Yellow |
| Triton X 15[h] | 3 | Slightly Yellow |
| Triton CF 32[i] | 5 | Yellow |
| Gafac 510[j] | 3 | Deep Yellow |
| Ethosperse CL20[k] | 5 | Yellow |
| Triton N 101 and Pegosperse 400 ML[l] | 5 | Slightly Yellow |

[a] Siponic is a registered trademark of Alcolac Chemical Corp. for fatty alcohol ethoxylates.
[b] Tween is a registered trademark of Atlas Chemical Industries, Inc. for polyoxyethylene derivatives of fatty acid partial esters of sorbitol anhydrides. Tween 20 is liquid polyoxyethylene sorbitan monolaurate.
[c] Amidox L-5 is an alkylol amide polyoxyethylene derivative from Stepan Chemical Co.
[d] Pluronic is a registered trademark of Wyandotte Chemicals Corporation for difunctional block copolymers terminating in primary hydroxyl groups.
[e] Pegosperse is a registered trademark of Glyco Chemicals, Inc. for polyglycol esters of fatty acids. Pegosperse 400 ML is polyoxyethylene monolaurate.
[f] Renex is a registered trademark of Atlas Chemical Industries, Inc. for ethylene esters and ethers. Renex 30 is polyoxyethylene tridecyl ether.
[g] Triton is a registered trademark of Rohm & Haas Co. Triton N101 is nonyl phenoxy polyoxyethylene.
[h] Triton is a registered trademark of Rohm & Haas Co. The (h) Tritons are octyl phenoxy polyoxyethlenes.
[i] Triton is a registered trademark of Rohm and Haas Co. Triton CF 32 is an alkylamine polyoxyethylene.
[j] Gafac 510 is an acid phosphate polyoxyethylene ester from GAF.
[k] Ethosperse is a registered trademark of Glyco Chemicals, Inc. for reaction products of fatty alsohols, glycols, glycerol, and sorbitol and ethylene oxide. Ethosperse C is cetyl alcohol polyoxyethylene.
[l] 0.25 phr Triton N 101 and 0.75 phr Pegosperse 400 ML added.

In Table III, a clarity of 5 is indicative of an acceptable film for a floor covering wear layer. Insofar as heat stability is concerned, the films which tested slightly yellow after heating are preferred.

It is to be remembered that the examples provided in Table III have been provided merely to present results obtainable by practice of the present invention. Inasmuch as many other nonionic emulsifiers, having the formula set forth hereinabove, are known and are believed to be operable herein, we do not intend to limit our invention to only those emulsifiers exemplified in Table III. As further stated hereinabove, the method involves the step of adding one or more of the nonionic emulsifiers disclosed to a plastisol resin paste formulation either prior to the step of spray drying or during the subsequent step of paste formation. Although the resin for the examples was prepared via the micro dispersion process, the method is operable with other dispersion plastisol resins prepared via emulsion, continuous emulsion or other known processes and therefore, the invention should not be limited to micro dispersion resins.

Thus, it can be seen that the disclosed invention carries out the objects of the invention set forth hereinabove. As will be apparent to those skilled in the art, clarity of plastisol resin films can be improved by the addition of any of the nonionic emulsifiers of the present invention to the plastisol resin paste prior to spray dyring, and it is believed that the determination of suitable emulsifiers can be obtained without departing from the spirit of the invention herein disclosed and described, the scope of the invention being limited solely by the scope of the attached claims.

We claim:

1. A method for improving the clarity of plastisol resin films prepared from a monomer selected from the group consisting of vinyl chloride and other monomers copolymerizable therewith comprising the sequential steps of:

polymerizing the desired monomeric ingredients and an aqueous phase in a suitable reactor to yield a latex, said aqueous phase comprising water;

an anionic surfactant;

a fatty compound; and an oil soluble free radical forming initiator;

dissolving a nonionic emulsifier in said latex and blending to form a uniform mixture;

spray drying said mixture to yield a resin containing said nonionic emulsifier said nonionic emulsifier having the formula R—O—(CH$_2$CH$_2$O)$_n$ H and R is selected from the group consisting of fatty acids polyol fatty acid esters, fatty alcohols, fatty amines, fatty amides, polypropylene oxides and alkylated phenols and N is an integer ranging from 1 to about 50;

forming a paste with said resin and a suitable plasticizer with mixing; and thereafter fusing a layer of said paste with heat to form a clear film.

2. A method for improving the clarity of plastisol resin films prepared from a monomer selected from the group consisting of vinyl chloride and other monomers copolymerizable therewith comprising the sequential steps of:

polymerizing the desired monomeric ingredients and an aqueous phase in a suitable reactor to yield a latex, said aqueous phase comprising water;

an anionic surfactant;

a fatty compound; and an oil soluble free radical forming initiator;

spray drying said latex to yield a resin;

blending a nonionic emulsifier with a suitable plasticizer to form a mixture said nonionic emulsifier having the formula R—O—(CH$_2$CH$_2$—O)$_n$ H and R is selected from fatty acid esters, fatty alcohols, fatty amines, fatty amides, polypropylene oxides and alkylated phenols and N is an integer ranging from 1 to about 50;

mixing said resin with said mixture to form a paste; and thereafter fusing a layer of said paste with heat to form a clear film.

3. A method, as set forth in claim 1 or 2, wherein the amount of said nonionic emulsifier added, based upon 100 parts of the resin, is from about 1.0 to about 5.0 parts.

4. A method, as set forth in claim 3, wherein said nonionic emulsifier is polyoxyethylene sorbitan monolaurate.

5. A method, as set forth in claim 3, wherein said nonionic emulsifier is polyoxyethylene monolaurate.

6. A method, as set forth in claim 3, wherein said nonionic emulsifier is polyoxyethylene tridecyl ether.

7. A method, as set forth in claim 3, wherein said nonionic emulsifier is nonyl phenoxy polyoxyethylene.

8. A method, as set forth in claim 3, wherein said nonionic emulsifier is octyl phenoxy polyoxyethylene.

9. A method, as set forth in claim 3, wherein said nonionic emulsifier is cetyl alcohol polyoxyethylene.

10. A method, as set forth in claim 3, wherein said nonionic emulsifier is a fatty acid ethoxylate.

11. A method, as set forth in claim 3, wherein said nonionic emulsifier is an alkylol amide polyoxyethylene.

12. A method, as set forth in claim 3, wherein said nonionic emulsifier is a polyoxyethylene-polyoxypropylene block copolymer terminating in primary hydroxyl groups.

13. A method, as set forth in claim 1 or 2, wherein the other monomers copolymerizable with vinyl chloride are selected from the group consisting of acrylic esters, methacrylic esters, acrylonitrile, maleic and fumaric acids and esters thereof and vinylidene chloride; and wherein said plasticizer is selected from the group consisting of n-butyl benzyl phthlate, dioctyl phthlate, dioctyl adipate, acetyl tributyl citrate and diisodecyl phthlate.

14. A method, as set forth in claim 13, wherein the monomer is vinyl chloride and said plasticizer is n-butyl benzyl phthlate.

15. A plastisol resin film product comprising: a polymer resin comprising 100 parts of a monomer selected from the group consisting of vinyl chloride, other monomers copolymerizable therewith and mixtures thereof;

from about 0.5 to about 3.0 parts of an anionic surfactant, per 100 parts of monomer;

from about 0.01 to about 0.1 parts of an oil soluble initiator, per 100 parts of monomer; and from about 0.5 to about 3.0 parts of a fatty alcohol, per 100 parts of monomer; a plasticizer; and from about 0.1 to about 5.0 parts per 100 parts of resin of at least one nonionic emulsifier having the formula R—O—(CH$_2$CH$_2$—O)$_n$H wherein R is selected from the group consisting of fatty acids, polyol fatty acid esters, fatty alcohols, fatty amines, fatty amides, polypropylene oxides and alkylated phenols, and n is an integer ranging from 1 to about 50.

16. A plastisol resin film product, as set forth in claim 15, wherein the other monomers copolymerizable with vinyl chloride are selected from the group consisting of acrylic esters, methacrylic esters, acrylonitrile, maleic and fumaric acids and acids esters thereof and vinylidene chloride; and wherein said plasticizer is selected from the group consisting of n-butyl benzyl phthlate, dioctyl phthlate, dioctyl adipate, acetyl tributyl citrate and diisodecyl phthlate.

17. A plastisol film product, as set forth in claim 16, wherein the monomer is vinyl chloride and said plasticizer is n-butyl benzyl phthlate.

18. A plastisol film product, as set forth in claim 15, wherein said nonionic emulsifier is polyoxyethylene sorbitan monolaurate.

19. A plastisol film product, as set forth in claim 15, wherein said nonionic emulsifier is polyoxyethylene monolaurate.

20. A plastisol film product, as set forth in claim 15, wherein said nonionic emulsifier is polyoxyethylene tridecyl ether.

21. A plastisol film product, as set forth in claim 15, wherein said nonionic emulsifier is nonyl phenoxy polyoxyethylene.

22. A plastisol film product, as set forth in claim 15, wherein said nonionic emulsififer is octyl phenoxy polyoxyethylene.

23. A plastisol film product, as set forth in claim 15, wherein said nonionic emulsifier is cetyl alcohol polyoxyethylene.

24. A plastisol film product, as set forth in claim 15, wherein said nonionic emulsifier is a fatty acid ethoxylate.

25. A plastisol film product, as set forth in claim 15, wherein said nonionic emulsifier is an alkylol amide polyoxyethylene.

26. A plastisol film product, as set forth in claim 15, wherein said nonionic emulsifier is a polyoxyethylene-polyoxypropylene block copolymer terminating in primary hydroxyl groups.

* * * * *

UNITED STATES PATENT AND TRADEMARK OFFICE
CERTIFICATE OF CORRECTION

PATENT NO. : 4,203,879

DATED : May 20, 1980

INVENTOR(S) : Raymond C. DeWald, Ronald M. Ellis and Stephen T. Fitzpatrick

It is certified that error appears in the above-identified patent and that said Letters Patent are hereby corrected as shown below:

Column 3, line 54

"phthalate" should be -- phthlate --

Column 3, line 60 delete 1 after 100

Column 5, Footnote (f), line 1 add oxide after ethylene

Column 5, Footnote (k), line 2

"alsohols" should be -- alcohols --

Column 6, line 18

"dyr-" should be -- dry- --

Signed and Sealed this

Ninth Day of December 1980

[SEAL]

Attest:

SIDNEY A. DIAMOND

Attesting Officer

Commissioner of Patents and Trademarks